United States Patent Office 3,836,520
Patented Sept. 17, 1974

3,836,520
DIGITOXIGENIN-3-α,L-RHAMNOSIDO-4'-ACYLATES
Ulrich Stache and Werner Haede, Hofheim, Taunus, Werner Fritsch, Neuenhain, Taunus, Kurt Radscheit, Kelkheim, Taunus, and Ernst Lindner, Frankfurt am Main, Germany, assignors to Farbwerke Hoechst Aktiengesellschaft vormals Meister Lucius & Bruning, Frankfurt am Main, Germany
No Drawing. Filed Aug. 17, 1972, Ser. No. 281,557
Claims priority, application Germany, Aug. 19, 1971, P 21 41 599.6
Int. Cl. C07c 173/00
U.S. Cl. 260—210.5       3 Claims

ABSTRACT OF THE DISCLOSURE

Digitoxigenin-3-α,L-rhamnosido-4'-acylates having positive inotropic activity and useful for the treatment of heart disease, particularly cardiac insufficiency. A method for making the same by acylation, in the 4'-position, of digitoxigenin-3-α,L-rhamnosido-2',3'-acetonides or -2',3'-orthocarbonates.

The present invention relates to digitoxigenin-3-α,L-[rhamnosido-4'-acylates] and to a process for their manufacture.

Digitoxigenin-3-α,L-[rhamnosido-4'-acylates] cannot be prepared by a direct selective esterification of the 4'-hydroxy group in the rhamnose radical. Surprisingly, however, this can be done by protecting the cis-positioned hydroxy group in 2'- and 3'-positions via cyclic derivatives that can easily be split off subsequently, the end products being obtained in good yields and with a high degree of purity.

Hence, this invention relates to 4'-acylates of digitoxigenin-3-α,L-rhamnoside (evomonoside) of the general formula I

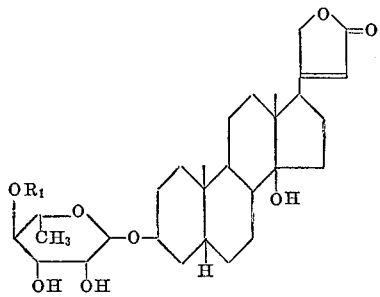

in which $R_1$ stands for an aliphatic, cycloaliphatic, araliphatic or aromatic acyl radical having 1 to 8 carbon atoms.

This invention relates further to a process for the manufacture of these compounds, wherein a digitoxigenin-3-α,L-rhamnoside is reacted with a ketone or an acetal thereof or with an ortho-carboxylic acid ester for conversion into the digitoxigenin-3-α,L-[rhamnosido-2',3'-acetonide or -2',3'-orthocarboxylic acid ester] of the general formula II

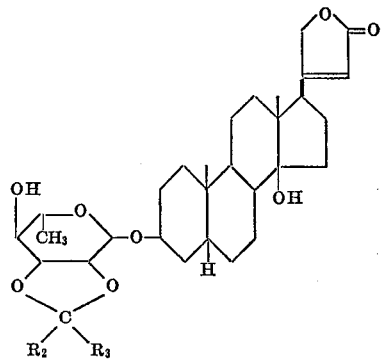

in which $R_2$ and $R_3$ each stands for a saturated alkyl group having 1 to 5 carbon atoms, or $R_2$ stands for a hydrogen atom or a saturated alkyl group having 1 to 3 carbon atoms, whereas $R_3$ stands for an alkoxy radical having 1 to 4 carbon atoms, or the meanings of $R_2$ and $R_3$ may also be vice versa, the compound obtained is treated with a carboxylic acid anhydride or a carboxylic acid halide of the general formula

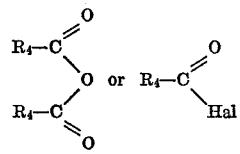

in which $R_4$ stands for an aliphatic, cycloaliphatic, aromatic or araliphatic alkyl radical having 1 to 7 carbon atoms and Hal stands for a chlorine, bromine or iodine atom, in the presence of an organic base and finally the 2',3'-acetonide or 2',3'-orthocarboxylic acid ester group is cleaned by a treatment with an acid.

In the first reaction step, the cis-positioned 2'- and 3'-hydroxy groups are blocked by the formation of cyclic derivatives. For this purpose, the evomonoside is suitably dissolved in an inert organic solvent, preferably dioxan, tetrahydrofuran, dimethyl-formamide, benzene, toluene, and subsequently a ketone, preferably acetone, ethylmethyl-ketone, diethyl-ketone, propylethyl-ketone, cyclohexanone and/or a dialkyl-acetal, for example the dimethyl acetal or the diethyl acetal of the ketones mentioned, is added for the formation of the acetonide. To convert the enomonoside into the corresponding 2',3'-orthocarboxylic acid ester, a low-molecular-weight orthocarboxylic acid ester, preferably orthomethyl or orthoethyl formate, orthomethyl or orthoethyl acetate or orthomethyl or orthoethyl propionate, is added instead of the ketones or acetals thereof as mentioned above. In all cases, catalytic amounts of an inorganic or organic agent giving an acid reaction, for example hydrochloric acid, sulfuric acid, p-toluene-sulfonic acid, boron trifluoride etherate, zinc chloride, copper sulfate or pyridinium hydrochloride, are added for bringing about the formation of the derivatives. The reaction mixture is then reacted for half an hour to 48 hours at a temperature of from 0° C. to the boiling point of the reaction mixture while the solvents, if benzene or toluene is used, can be continuously separated from the reaction mixture by distillation during the reaction. The reaction mixture is worked up by pouring it into water containing excess alkali metal carbonate or bicarbonate or an organic base, for example pyridine, for the neutralization of the acid agents used, and the reaction product is extracted in usual manner with an organic extracting agent, for example methylene chloride or chloroform. The reaction product obtained in a quantitative yield is generally used without further treatment in the second reaction step. It may, however, also be prepared in pure state by crystallization or chromatography. For this purpose, the crude product obtained is dissolved in an organic inert solvent, for example tetrahydrofuran or dioxan, a tertiary organic base, preferably pyridine, and then either a carboxylic acid anhydride, for example acetic acid anhydride, propionic acid anhydride, butyric acid anhydride, valerianic acid anhydride or the mixed anhydride of formic acid and acetic acid, or a carboxylic acid halide, preferably a carboxylic acid chloride, for example acetyl chloride, propionyl chloride, butyryl chloride, valerianic acid chloride, benzoyl chloride, cyclohexanoyl chloride, is added, the amount of organic base added being at least equivalent to the amount of the carboxylic acid derivative added.

The reaction mixtures are then allowed to stand for a period of 1 to 120 hours at temperatures of from 0° to 110° C., and then worked up in usual manner. For this purpose, the reaction mixture is poured into water and the reaction products are extracted, unless they precipitate in a solid filterable form, by means of an extracting agent, preferably methylene chloride, chloroform or ethyl acetate. The reaction products, obtained in a quantitative yield, are used either as crude products or after crystallization from a suitable solvent for the subsequent reaction.

The cyclic 2',3'-acetonides or ortho-carboxylic acid esters are split off by treating the reaction products obtained, advantageously in aqueous glacial acetic acid, for a period of from 5 minutes to 100 hours at a temperature of from 0° to 110° C. and heating them preferably for 5 to 40 minutes to 70°–110° C. After having been cooled and diluted with water the compounds of the formula I are isolated in a pure form by extraction with a suitable solvent, for example methylene chloride or chloroform, and recrystallization. They may also be prepared in pure form by chromatography on silica gel or aluminum oxide.

The yields obtained by the third reaction step amount to 90 percent. According to this preferred embodiment of the invention, it is very surprising that side reactions, such as in particular the splitting off of the 14β-hydroxy group, which is unstable toward acids and important for cardio-activity, not observed to any appreciable extent.

For splitting off the cyclic 2',3'-derivatives, the reaction products obtained by the second reaction step can also be dissolved in aqueous alcohols, treated, after addition of acids, for example hydrochloric acid, sulfuric acid or p-toluene-sulfonic acid, at a temperature of from 0° to the boiling points of the alcohols used (ethanol, propanol, methanol) for a period of from 1 minute to 100 hours, worked up as disclosed above and isolated in pure state.

The products of the invention have valuable pharmacological properties. They are distinguished by a high positive inotropic activity and can be used particularly in human therapy for the treatment of heart diseases, especially cardiac insufficiency. Compared to the evomonoside that is not esterified in 4'-position, the 4'-acylates show a substantially increased enteral absorption rate in the gastro-intestinal tract after oral administration and can therefore be used advantageously for oral medication in therapy. The increased absorption rate allows evomonosido-4'-acylate compositions to be better controlled in practice.

The new compounds are valuable thereapeutic agents against cardiac insufficiency. The single dose for a human being may be from about 0.1 to 0.5 mg. per unit. The new compounds may be therapeutically administered above all in their oral administration form as dragées, tablets or capsules, for which the usual pharmaceutical carriers, for example, starch, lactose, tragacanth, magnesium stearate and talcum, may be used. For intravenous injections, water or physiological sodium chloride solution may serve as solvents for the ampoules.

According to the process of the invention, the following evomonosido-4'-acylates can be prepared:

evomonosido-4'-acetate,
evomonosido-4'-propionate (n- or iso-form),
evomonosido-4'-formiate,
evomonosido-4'-butyrate (n- or iso-form),
evomonosido-4'-valeriate (n- or iso-form),
evomonosido-4'-capronate (n- or iso-form),
evomonosido-4'-benzoate,
evomonosido-4'-cyclohexylcarboxylic acid ester,
evomonosido-4'-cyclopentylcarboxylic acid ester,
evomonosido-4'-cyclopentyl propionate,
evomonosido-4'-cyclopentyl acetate,
evomonosido-4'-trimethyl acetate,
evomonosido-4' -heptylate, and
evomonosido-4'-methoxy acetate.

The following Examples serve to illustrate the present invention.

EXAMPLE 1

(a) 120 mg. of p-toluene-sulfonic acid were added to a solution of 0.92 g. of evomonoside in 30 ml. of absolute dioxan, 20 ml. of acetone and 10 ml. of acetone dimethyl acetal and the mixture was stirred or allowed to stand for 4 hours at 20° C. It was then poured into 300 ml. of semisaturated aqueous sodium chloride solution containing excess sodium bicarbonate for the neutralization of the acid. The mixture was extracted with chloroform, and extracts were washed with water, dried and evaporated. 1.1 g. of evomonosido-2',3',-acetonide were obtained as a foam that was used for subsequent reaction without further treatment.

Typical infrared bands (KBr): 3460, 1780, 1750 (shoulder), 1620, 1130, 1065, 1050, 1020 cm.$^{-1}$.

(b) ($\alpha$) 19 ml. of acetic acid anhydride were added to a solution of 1.1 g. of evomonosido-2',3'-acetonide in 30 ml. of pyridine and the mixture was allowed to stand for 40 hours at 20° C. It was then poured on to 200 ml. of semisaturated aqueous sodium chloride solution, extracted with chloroform, washed with water, dried and evaporated in vacuo. 1.3 g. of oily evomonosido-2',3'-acetonide-4'-acetate were obtained.

Typical infraded bands (in oil): 3490, 1775, 1750, 1730, 1620, 1230, 1070, 1040, 1020, 1000 cm.$^{-1}$.

($\beta$) A solution of 0.3 ml. of acetyl chloride in 0.6 ml. of dioxan was added dropwise with stirring and external cooling to a solution of 220 mg. of evomonosido-2',3'-acetonide in 2 ml. of absolute dioxan and 2 ml. of pyridine. The mixture was stirred for 16 hours at 20° C. and worked up as disclosed sub (a). 0.25 g. of evomonosido-2',3'-acetonide-4'-acetate having the same infrared spectrum as indicated sub (a) was obtained.

(c) 2.1 g. of evomonosido-2',3'-acetonide - 4' - acetate obtained according to (b) ($\alpha$) or ($\beta$) were dissolved in 12 ml. of glacial acetic acid and the solution was heated, after addition of 12 ml. of water, to 100° C. for 20 minutes under a nitrogen atmosphere. It was then poured into 600 ml. of water containing the amount of sodium bicarbonate required for the neutralization of the acetic acid. The mixture was extracted with methylene chloride and the extracts were washed and dried. 2.0 g. of a foam were obtained which was crystallized from isopropyl ether. 1.7 g. of evomonosido-4'-acetate having a melting point of 239°–242° C. were obtained. After recrystallization from methylene chloride/acetone/ether the melting point was 244° C. (Kofler heating device).

Typical infrared bands (KBr): 3550, 3470, 1745–1725, shoulders at 1800 and 1775 and at 1635 and 1625, 1615, 1240, 1035 (with several side bands in the short-wave and medium-wave ranges) cm.$^{-1}$.

UV: λ max.=216.5 nm. (methanol); ε=16,300, $[\alpha]_D^{20°}$=−50° (methanol).

EXAMPLE 2

(a) 60 mg. of p-toluene-sulfonic acid were added to a solution of 0.5 g. of evomonoside in 23 ml. of absolute dioxan and 3 ml. of triethyl orthoformate and the mixture was stirred or allowed to stand for 3 hours at 20° C. It was then poured into 100 ml. of semisaturated aqueous sodium chloride solution containing excess sodium bicarbonate for the neutralization of the acid. This mixture was extracted with chloroform and the extracts were washed with water, dried and evaporated in vacuo. 0.5 g. of evomonosido-2′,3′-ethyl orthoformate was obtained in the form of a foam.

Typical infrared bands (KBr): 3470, 1780, 1750 (shoulder), 1740, 1620, 1120, 1060, 1025, 980 cm.$^{-1}$.

(b) 13 ml. of acetic acid anhydride were added to a solution of 0.5 g. of evomonosido-2′,3′-ethyl orthoformate [used as a foam as obtained according to (a)] in 20 ml. of pyridine, and the mixture was allowed to stand for 20 hours at 20° C. Then it was poured on to 100 ml. of semisaturated aqueous sodium chloride solution. This mixture was extracted with chloroform and the extracts were washed with water, dried and evaporated in vacuo. 604 mg. of oily evomonosido-2′,3′-ethyl-orthoformate-4′-acetate were obtained.

In the infrared spectrum (oil) there were additional bands at 1240 cm.$^{-1}$.

(c) 1 g. of oily evomonosido-2′,3′-ethyl-orthoformate-4′-acetate was reacted in 6 ml. of glacial acetic acid and 6 ml. of water in the manner disclosed in Example 1 (c) and the reaction product was worked up in the same manner. After the residue obtained had been crystallized from methylene chloride/acetone, the evomonosido-4′-acetate was obtained, which was identical with the product obtained in Example 1 (c) in all the data given.

EXAMPLE 3

(a) A solution of 0.7 ml. of n-propionyl chloride in 1.2 ml. of dioxan was added dropwise to a solution of 0.5 g. of evomonosido-2′,3′-acetonide (Example 1 (a)) in 4 ml. of absolute dioxan and 4 ml. of pyridine. After the mixture had been stirred for 16 hours at 20° C., it was worked up in the manner disclosed in Example 1 (b). 540 mg. of oily evomonosido-2′,3′-acetonide-4′-n-propionate were obtained.

Typical infrared bands (oil): 3500, 1775, 1750–1725, 1620, 1240, 1075, 1020, 990 cm.$^{-1}$.

(b) 0.5 g. of the evomonosido-2′,3′-acetonide-4′-n-propionate obtained according to (a) was reacted in 3 ml. of glacial acetic acid and 6 ml. of water in the manner disclosed in Example 1 (c) and the reaction product was worked up in the same manner. After the residue obtained had been recrystallized from methylene chloride/acetone/ether, the evomonosido-3′-n-propionate was obtained, which had the following typical infrared bands (KBr): 3480, 1780, 1745–1725, 1625, 1245, 1040 (with several side bands in the short-wave and medium-wave ranges) cm.$^{-1}$.

UV: λ max.=217 nm. (methanol); ε=16,100.

What we claim is:

1. A digitoxigenin-3-α,L-rhamnosido-4′-acylate of the formula

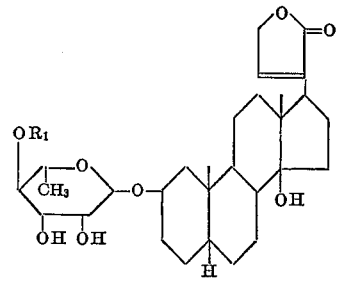

wherein $R_1$ is saturated aliphatic acyl having 1 to 4 carbon atoms, cyclohexylcarbonyl, cyclopentylcarbonyl, cyclopentylpropionyl, cyclopentylacetyl, or benzoyl.

2. Evomonosido-4′-acetate.
3. Evomonosido-4′-propionate.

References Cited

UNITED STATES PATENTS

| | | | |
|---|---|---|---|
| 3,732,203 | 5/1973 | Stache, et al. | 260—210.5 |
| 3,743,633 | 7/1973 | Goerlich et al. | 260—210.5 |

JOHNNIE R. BROWN, Primary Examiner

C. B. OWENS, Assistant Examiner

U.S. Cl. X.R.

424—182